United States Patent [19]

Rhymer et al.

[11] Patent Number: 4,998,359

[45] Date of Patent: Mar. 12, 1991

[54] AUTOMATIC WAX LUBRICATOR FOR FLATWORK IRONER

[75] Inventors: Bill R. Rhymer, St. Louis, Mo.; Luc Rouquart, Ghent, Belgium

[73] Assignee: The Rhymer Company, St. Louis, Mo.

[21] Appl. No.: 415,963

[22] Filed: Oct. 2, 1989

[51] Int. Cl.⁵ ............... D06F 63/00; D06F 63/02; D06F 87/00; B05B 12/00

[52] U.S. Cl. ............................................. 38/14; 38/44; 38/3; 239/566; 239/567; 239/81; 118/50; 118/70

[58] Field of Search .............. 38/3, 14, 52, 54, 55, 38/56, 57, 58, 47, 48, 44; 239/556, 567; 118/50, 70, 325; 100/89, 90; 261/24, 25

[56] References Cited

U.S. PATENT DOCUMENTS

| | | | |
|---|---|---|---|
| 3,003,177 | 10/1961 | Hijiya | 239/566 X |
| 3,552,353 | 1/1971 | Labombarde | 118/70 |
| 3,736,902 | 6/1973 | Glanzer | 118/50 |
| 4,278,711 | 7/1981 | Sullivan | 239/81 X |
| 4,372,494 | 2/1983 | Naturel | 239/567 X |
| 4,498,254 | 2/1985 | Schädlich | 38/14 |
| 4,599,814 | 7/1986 | Geiger | 38/14 X |

Primary Examiner—Werner H. Schroeder
Assistant Examiner—Ismael Izaguirre
Attorney, Agent, or Firm—Paul M. Denk

[57] ABSTRACT

A flatwork ironer for the ironing of sheets, including a housing, having a series of troughs, and a roll associated with each, spray device in proximity with each roll, for the timed spraying of lubricating wax thereon, the spray includes a spray conduit, for conveyance of wax under pressure from a reservoir for dispensing through spray nozzles onto each roll for the time needed, and then providing a return line for draining any excess wax back to the reservoir; the controls for automatic spraying of lubricating wax onto the roll(s) includes a pump, a motor, a computer program including a timer, various solenoids, cams, for furnishing the controlled de-energization of the flatwork feed table and vacuum motors, and the initiation of a lubricating cycle, to achieve its functioning, with a reinitiation of the ironer mechanisms for further operation, with the automatic resetting through circuitry of the timer in preparation for the next lubricating cycle.

4 Claims, 3 Drawing Sheets

AUTOMATIC WAX LUBRICATOR FOR FLATWORK IRONER

BACKGROUND OF THE INVENTION

This invention relates generally to flatwork ironers, and more specifically pertains to control means for use in conjunction with lubricating sprayer for periodic and controlled deposition of lubricating wax onto the chests and gap pieces of a flatwork ironer, at the time and in the amount which is necessary to ensure proper waxing.

A laundry flatwork ironer is an industrial machine which incorporates one or more rollers, that consist of large cylinders, usually one for each chest, trough or bed, and which may be of varying length, but usually approximately ten feet long, and anywhere from one to four feet in diameter, although other sizes may have been made or are available. The roll is most often perforated with holes and covered with a spring system in addition to a fabric called padding. At one end of the roll there is usually an opening onto which is attached a vacuum motor, with the idea of the motor being to draw a vacuum from the roll that helps evacuate any moisture evaporated during processing and ironing of flatwork items, such as sheets, bedspreads, and the like. The idea of the springs and padding is to provide a cushioning against which the articles being ironed can rest, as well as to provide sufficient friction to achieve a pulling of the flatwork articles being ironed through the ironer during its usage. Such an ironer, which is frequently called a mangle, may consist of one or more rolls, as previously stated. Each roll rotates in a half-cylinder chamber, sometimes called a trough, bed, or chest, and which is normally heated with high pressure, approximtely 125 psi steam, or other heating medium, such as hot oil. The concaved portion of the trough or chest is highly polished, and the roll is sized to fit reasonably tightly and contiguously into the trough when in its operative position. The function of the ironer is to simultaneously dry and press, or iron, the damp, clean flat pieces, such as sheets or table linens, as they pass through the ironer.

To operate the aforesaid machine, the article to be ironed is placed onto a flat feed table, which consists of a conveyor, generally as wide as the mangle itself, and which is made of fabric belts which move towards the first roll and trough at a speed similar to the surface speed of the rotating roll. The piece being ironed is ultimately grabbed by the friction of the padding of the roll, and is pulled at roll speed down into the concaved trough or chest, and out of the backside of the same. Because the inner surface of the chest is highly polished, as aforesaid, and maintained very hot, the article is instantaneously dried, and ironed, as it moves between the roll and the chest. As the flat piece exits the chest, some type of device, normally guide tapes, are used to strip it off from the roll, and to prevent its going all the way around the roll again as it rotates.

The action of a piece being ironed in the above manner creates a great deal of friction and static electricity. To minimize the friction and to facilitate the smooth travel of a linen piece through the ironer, waxes have traditionally been used and applied to the chests, to achieve their lubrication. Traditionally, parafin waxes have been crushed or chipped into flakes, and then spread by hand between two layers of cloth, generally called a wax cloth, and run through the ironer just like a piece of flatwork being ironed. Waxes, having a paste consistency, also have been employed for the same purpose. The heat from the trough causes the wax to melt and leaves a residue of wax on the surface of the chests. This residue lasts for a variant amount of time, depending upon the ironing speeds, the temperatures involved, and other factors, but usually re-waxing is required every couple of hours, or so.

Many variety of parafin waxes are still available and used today, as are other types of lubricating means, such as one identified as Karagami, which is believed to be a honey residue, in addition to other types of mineral waxes that are available.

The waxing problem of the flatwork ironer, or mangle, is becoming a significantly greater problem today because of the newer developments being generated in the laundry field. Originally all textiles were natural ones, both for the pieces being ironed, in addition to the roll padding itself. Soaps were of a natural origin, and ironing speeds and temperatures were maintained at a lower level. But, today the usage of synthetic fibers for both articles being ironed, and for the padding, creates additonal problems. In addition, the use of much higher ironing temperatures in the processing of this type of technology, in order to attain higher speeds, achieved through more automatic feeding and folding devices that are used in conjunction with the flatwork ironer, generates additional problems. Increased speeds for operations of the flatwork ironer creates more static electricity, which does have some detrimental effect on the folding machinery used in conjunction with the ironer, and somewhat incidentally on the controls of the apparatuses. But, generally, the static electricity causes the ironed flatwork piece to levitate, or stick or adhere to the conveying means of the folder, in such a way that the piece does not fold properly or simply jams in the folder, usually requiring a temporary shut-down of production until such time as the jammed piece has been extricated and removed. And, such a condition always requires that the jammed piece be reprocessed, and sometimes, the flatwork piece involved is destroyed in the process. Also, it is possible to build up so much friction and static electricity in the iron that it completely stops the machine, which can sometimes cause a blowing of fuses, breakage of circuit breakers, or an overloading of the drive motor itself.

To combat the foregoing problem, the operators of said flatwork ironers begin a vicious cycle of waxing, re-waxing, cleaning and waxing again. Traditional waxes begin to yellow and carbonize at temperatures that are somewhat lower than the ironing temperatures themselves. Re-waxing covers this carbonized residue with another layer of wax, which itself begins once again to carbonize. Eventually this residue must be removed by mechanical means, or perhaps through the application of harsh and more caustic chemicals, for the purpose of desolving such accumulated residue. Or, such mechanical means as steel mesh, steel wool, or emory cloth are currently being used and passed through the ironer to achieve such cleaning. These type of devices, as in the instance of mechanical means, create minuscule scratches in the metal of the trough, while the chemicals have a tendency to dissolve the residue, exposing the microscopic pores in the chest, all of which has a tendency to make the chest exhibit a roughened surface, that just provides and creates new places and locations for the build-up of residue wax to occur, with the overall problems being intensified, requiring more and additional waxing.

New and improved waxes have been generated and developed for usage in these ironing devices, but such waxes generally are not very susceptible for automatic dispensing, as through spray means, and as a result, mechanizing the spraying and cleaning process has not progressed to the extent that such is desired. Formulations have been developed incorporating polyolefins, in order to provide better facility for usage and the application of such waxes to the mangles of a flatwork ironer. But, even with the usage of these newer formulations of high-temperature waxes, the time and labor consuming process of passing a wax cloth through the ironer every couple of hours was still required. And, utilizing that old process for application of the wax to the flatwork ironer still entails the consumption of from ten to fifteen minutes each time, meaning that the entire ironer crew is non-productive during that cleaning cycle, further meaning that a standard crew of from two to six people are left idle, at frequent periodic times throughout the work shift. In addition, the lost volume of work turnout can accumulate to approximately one-sixteenth of a work day, or more, due to such downtime. Furthermore, anti-static agents present in the newer formulations dissipate much faster than the lubricating properties do, and as a result, static electric attractions, in the flatwork linens, and also which build up in the ironers, and their subsequent folders, still presents a significant problem.

Thought has been given towards providing an automatic remedying of some of the problems associated with ironer lubricating, and such can be seen in the U.S. Pat. No. 4,498,254, to Schadlich. That patent discloses an apparatus for decreasing the friction of pieces of wet or damp laundry, as they pass through an ironer, and as shown in that particular disclosure, a liquid lubricating agent incorporating a silicone oil or silicone oil emulsion is passed through a spray means for application directly onto a flatwork ironer. But, the application of the spray means was done specifically as an atomized composition, meaning that the light application of a mist onto the rollers may not be significantly enough to provide and afford the type of lubricating necessary, in addition to achieving anti-friction, anti-static, and to effect cleaning of the trough, as required.

Other spray devices utilized for application of oiling material, in the particular instance to a metal stock, is shown in the United States patent to Glanzer, U.S. Pat. No. 3,736,902.

SUMMARY OF THE INVENTION

A principal object of this invention is to provide means for furnishing electronic or electrical controlling of the periodic spraying of a polyolefin wax onto a flatwork ironer at the correct time and in the correct amount to achieve its effective lubrication, cleaning, with the consumption of a minimum of downtime.

In an effort to resolve and solve the type of problems as previously reviewed, in the background of the invention, and to provide a more effective waxing system for laundry flatwork ironers, the subject matter of the current invention was devised. The system consists of three parts, (1) a liquid wax formulation, (2) a mechanical system to spray the liquid, and (3), a control system to regulate the frequency and amount of wax applied. The wax is generally formulated incorporating as its basic ingredient a saturated polyolefin wax, blended with an anti-static lubricant, in addition to a cleaner, to achieve the results and overcome the problems as previously alluded to. More specifically, the anti-static agents and the cleaner includes further ingredients blended with the polyolefin wax in the category of a phosphoric acid esters, neutralized with triethanolamine, in addition to an ethoxo-propoxylated fatty alcohol and fatty acids. The melting point of such a composition commences at approximately 52° C., with its boiling point in the range of 175° C. Thus, when a composition of this nature and maintained at room temperature is pumped into a spray means for spraying out of the spray nozzles and onto the ironer roll, and since the ironer chest is maintained at a temperature of approximately 300°–340° F., or the oil heated within the style of trough incorporating such is maintained at a temperature of approximately 420° F., it can be readily seen that the deposition by spraying of a wax composition onto the roll, during the lubricating cycle, provides for a comprehensive application of such a lubricating wax to the chest as the roll rotates without any work going through the ironer. Thus, to reiterate, when a composition of this nature at room temperature is pumped into a spray means for spraying out of the spray nozzles and onto the ironer roll, and since the ironer roll is rotating in the chest, and since the feeding of the work through the flatwork ironer has been temporarily halted during the spraying, it can be readily seen that the wax formula will be comprehensively applied to the ironer chest by the action of the rotating roll in the chest, and therefore achieves the results of lubricating, cleaning, and imparting an anti-static compound to the flatwork ironer with a minimum of down time and no physical labor, assuring a ready application of the flatwork ironer for processing work to be ironed. Hence, through this procedure, of this invention, a minimum of down time is consumed, and assures a ready application of the flatwork ironer, for use for ironing of such type cloth components.

The structure utilized to achieve the foregoing results is the disposition of a spray conduit, incorporating a series of especially designed spray nozzles, arranged spacedly along the length of the conduit, with the conduit being arranged at a position in relationship to the roll, so as to provide for a direct spray, under pressure, of wax to the roll surface, during its application. The spray conduit is in communication with a feed line that receives a supply of the wax composition, under pressure, from a reservoir or tank of such wax, with the feed line having a pump incorporated therein, being driven by a motor, in order to achieve a pumping of the wax fluid to the spray line, and out of the spray nozzles, for application onto a roll. A solenoid means in the form of a valve is arranged at the intake end of the spray conduit, and the valve is designed to prevent the entrance of the wax fluid under pressure into the conduit, until such time as a timer means has determined that all flatwork material passing through the ironer has been cleared, before any of the wax composition is allowed to flow into the spray conduit, for discharge onto the roll surface. At the opposite end of the spray conduit is a drain means, communicating with a drain return line, and which line extends back to the wax reservoir, for a return of any excess wax back to the reservoir, in excess of that which was needed for spraying onto the roll(s). Many of these flatwork ironers include a pair of rolls or more, up to ten or twelve, with a corresponding number of troughs, or chests, for achieving a more complete ironing and drying of the flatwork pieces. In these instances, there may be a sprayer associated with each of the rolls, of the type as previously identified, each having its own controlling solenoid valve associated therewith, for assuring the proper timing in the delivery of pressurized wax to the spray means. Other control means are used in conjunction with this spray means, including a low level control within the reservoir for determining and assuring that the proper level of wax is maintained, and which will signal when a low level of wax is encountered, for alerting the worker that an additional supply must be added, before the next lubricating cycle occurs. A control box is used in conjunction with the system, for controlling the frequency of the wax application, the momentary pause in feeding flatwork pieces through the flatwork ironer while waxing is taking place, the momentary dissabling of the roll vacuum motors so no wax is pulled through the padding and rolls during the spraying of the wax onto the rolls, the starting of the pump motor, the opening of the solenoid valves at the entrance to each spray bar when required, the length of the spraying time, the closing of the solenoid valves, the stopping of the pump motor, the restarting of the vacuum motors, and the restarting of the feeding conveyor. Both the motor, the pump, its various solenoids, in addition to the low level controls, provide for the proper sequencing and timing of the operations of the waxing device, in conjunction with the routine usage of the flatwork ironer, and its roll, during application. And likewise, both operate in conjunction with the control box, and its control and timer means therein for assuring that all flatwork pieces will have previously cleared its respective mangle, before a one cycle, or revolution, or more, of the mangle(s) occurs simultaneously with the application of a spray of lubricating wax thereon, so as to assure that none of the flatwork pieces being ironed are soiled directly by the application of any wax thereto. Essentially, this invention is designed for eliminating the need for the manual application of wax to the ironer, the necessity for passage of a wax cloth therethrough, and through the usage of the timed and sequence application of a spray of the lubricating wax, particularly of the polyolefin variety, incorporating other ingredients, as aforesaid, improve upon any prior devices that may have only misted or atomized for a period of time the lubricating wax onto the mangle, under conditions that may lead to excessive downtime. The current invention only requires the spraying for a varying length of time depending on the need of a roll, with an polyolefin wax that has been doctored with both an antistatic agent, and a cleaner, to achieve the intended and desirable results.

One of the principle objects of this invention is to provide mechanized means for use in conjunction with the spraying of lubricating wax onto the roll(s) of a flatwork ironer.

Another object of this invention is to eliminate the manual necessity for attaining lubricating of an ironer, through the application of automatic means, that cooperates with timers, for providing an application of lubricating wax to the roll(s) and thence to the chests of such an apparatus.

Still a further object of this invention is the use of automated means including pump, motor, timers, controls, solenoids, in conjunction with a spray conduit and nozzles, for the automatic dispensing of lubricating wax to the surface of ironer mangle(s).

Still another object of this invention is to provide timer means that reasonably precisionally determines the function and operations of a flatwork ironer, to initially assure that any flatwork linen pieces have been cleared of the roll(s), before lubricating wax is periodically applied thereto, and then allowing for the reinitiation of the ironer functioning.

A further object of this invention is the utilization of a polyolefin type lubricating wax in conjunction with a timed spray means for use in its application to the roll(s) and thence the chests of a flatwork ironer.

Another object of this invention is to enhance the production of a flatwork ironer due to the quicker, less bothersome, method of lubricating it.

A further object of this invention is to completely eliminate the necessity for use and storage of the wax cloth.

A further object is to provide better ironing quality in the processing of flatwork material by ensuring proper and timely waxing.

Still another object is to have a more precision method for lubricating of a flatwork ironer, and thereby reduce electrical consumption.

Yet another object of this invention is to reduce maintenance costs in the application of a flatwork ironer.

Still another object of this invention is to substantially reduce strain on the ironer motors and bearings, by providing automatic means for assuring the continued lubrication of it.

Still another object is to substantially reduce the static electricity problems associated with a flatwork ironer, and thereby facilitating its usage and application.

These and other objects will become more apparent to those skilled in the art upon reviewing the summary of this invention, as provided herein, in view of the description of the preferred embodiment as hereinafter set forth.

DESCRIPTION OF THE PREFERRED EMBODIMENT

Figure 1:
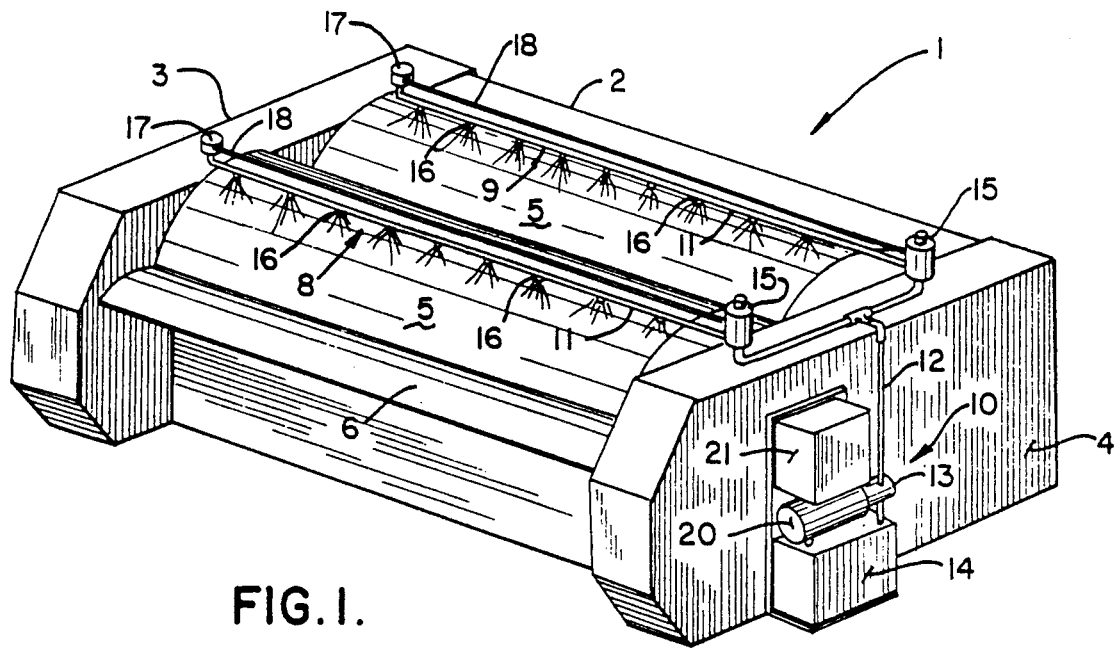
FIG. 1 is an isometric view of a flatwork ironer showing the various mechanisms for providing the automatic spraying of lubricating waxes onto the surface of the shown roll(s)
Figure 2:
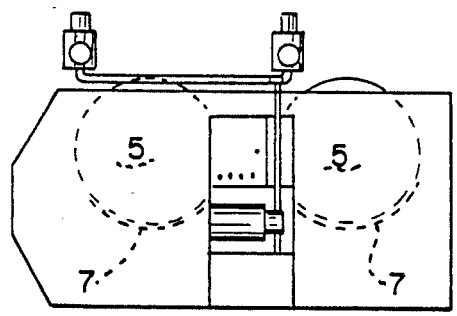
FIG. 2 is a right side view thereof.
Figure 3:
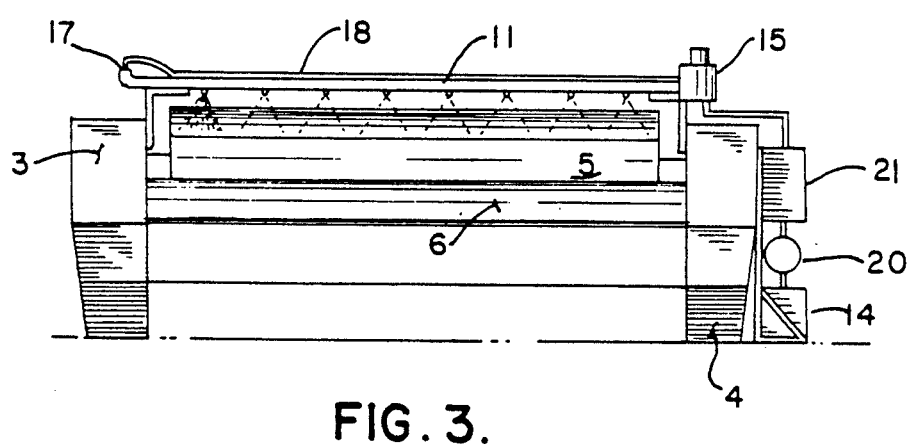
FIG. 3 is a front view thereof.

In referring to the drawings, and in particular FIGS. 1 through 3, the flatwork ironer 1 of this invention is fully disclosed. Flatwork ironers of this design are reasonably conventional, and incorporate a housing, as at 2, having side wall members 3 and 4, and have one or more rolls, as at 5, arranged therein for undertaking a revolving motion for acceptance of a flatwork piece of linen, such as a sheet, bedspread, tablecloth, or the like, that is applied to the feed means, or feeding table 6 for entrance to the chests for ironing. The usage of rolls for this particular purpose within a flatwork ironer is well known in the art, and generally, as reviewed in the background of this invention, steam or other heating medium is applied to the chest, as shown at 7, in FIG. 2, and in combination with the vacuum means that evacuates the interior of the roll(s), for evacuating any moisture or wetness from the flatwork material or sheets passing through the ironer, provides for simultaneously both a drying and pressing of the flat piece, as it passes through the ironer during its usage and application. Motor means are provided for rotating the rolls during ironer functioning.

Figure 4:
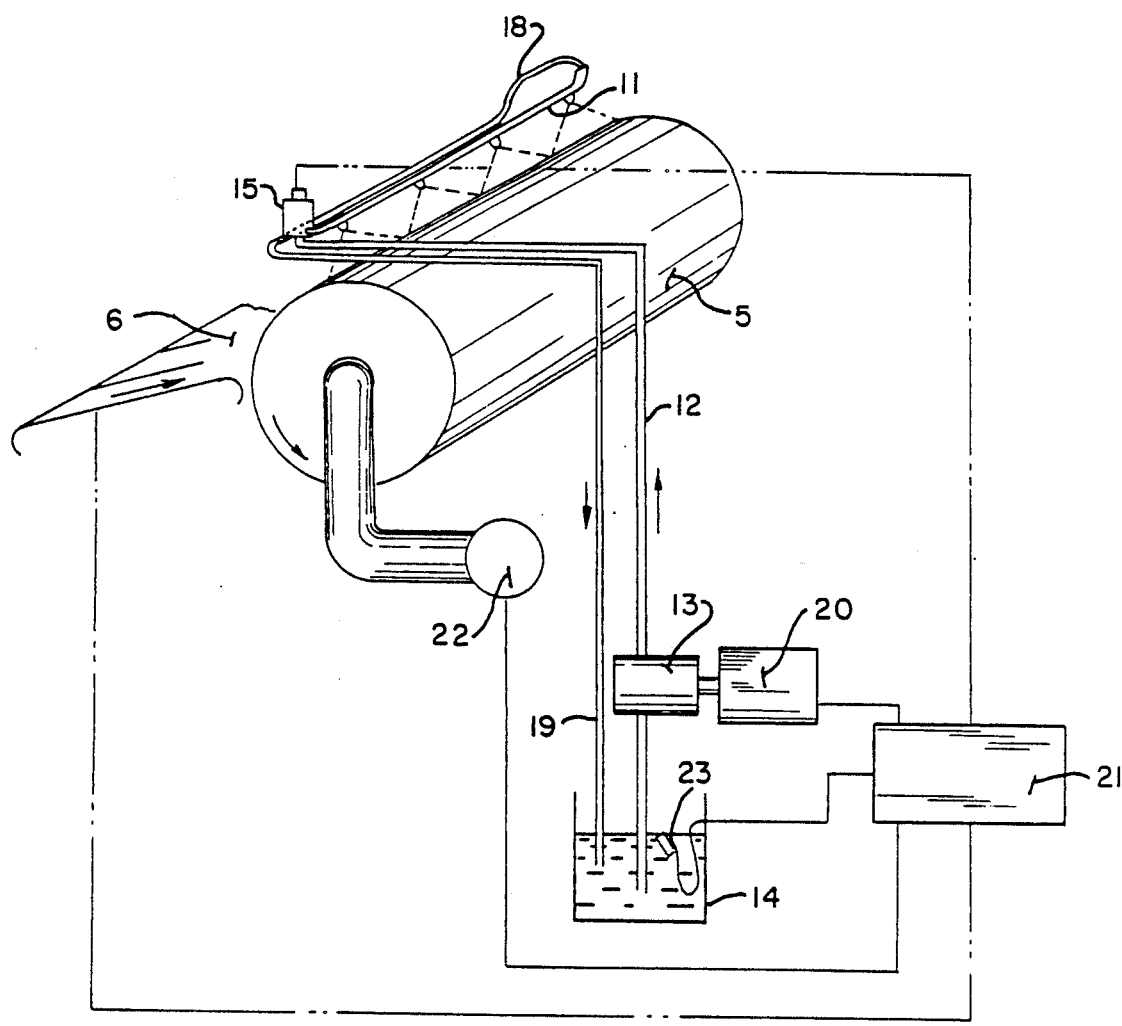
FIG. 4 is a schematic view of the various mechanisms used in controlling the functioning of the flatwork ironer, and for pumping and spraying of lubricating wax onto a roll(s)

The enhancements of this particular invention are more accurately shown in the various spray means, and controls therefore, used in conjunction with this ironer. In this particular instance, since there are two rollers shown, there are a pair of spray means at at 8 and 9, which operate in conjunction with the control mechanism 10, for providing the periodic dispensing of lubricating wax onto the surface of the rolls and thence to the chests, at predetermined specified periods of time throughout the work shift. Each spray means includes a spray conduit, as at 11, and which conduit has a branch line 12 that extends downwardly to a pump 13 where the liquified lubricating wax is pumped from the reservoir 14 to each of the spray conduits, as noted. At the entrance end of each spray conduit 11 there is a solenoid valve 15 which functions to allow the wax under pressure to enter into the spray conduit, and be periodically discharged from the spray nozzles 16, as can be seen. The spray nozzles can be obtained from Spraying Systems Co., of Wheaton, Ill. Each spray conduit 11 incorporates a return or drain end, as at 17, that connects with a return line 18 for providing a return, by way of a return conduit, as at 19, as shown in FIG. 4, back to the reservoir 14. A motor means 20 is provided for furnishing the operations of the pump 13, as required, and a control panel 21 incorporates all the various electrical and electromechanical controls for attaining the timed operations and functioning of the lubricating means in conjunction with the routine functioning of the flatwork ironer.

As can also be seen in FIG. 4, the vacuum means 22 for reducing the pressure within the shown roll 5 is provided, which effectively helps to eliminate moisture from the flat piece being ironed. This vaccum fan is automatically turned off during the waxing cycle (spray) so wax is not pulled through the padding and roll during spraying. In addition, a low-level control, as at 23, is provided within the wax reservoir 14, so as to caution when the quantity of wax within the reservoir has reached a low level, and needs to be replenished.

The functioning of this particular flatwork ironer is achieved in various phases, and essentially, the ironer will be routinely utilized, for the ironing of flat pieces, after its chest(s) has been properly lubricated. In phase 1, the timer control within the control panel 21, as to be subsequently described, stops the feed table 6 from delivering of additional flat work pieces to the ironer. On the other hand, this timer control could be initiated by an ammeter which detects a heavy draw of current by the motor because of friction between the mangle and trough due to a developing need to relubicate. At this time, the roll(s) will continue to rotate, for a few seconds, so as to allow any previously delivered flat pieces to properly clear the ironer, before any lubrication takes place Simultaneously, the pump 13 is initiated by means of operation of the motor 20, so as to start the build up of pressure for delivery of lubricating wax, under pressure, through the feed line 12, to the spray conduit 11, or at least to its solenoid valve 15, where it builds up pressure at that location. In phase 2, when the last piece of flat work has passed through the ironer, after a delay of 10 seconds, more or less, in the continued rotation or revolving of the roll(s) 5, the exhaust fan or vacuum 22 is interrupted in its functioning. At this time, the solenoid 15 for the front mangle 5 opens, thereby allowing the lubricating wax to flow under pressure through the spray conduit 11 and to be discharged from its various spray nozzle 16, onto the roll 5. The control panel is regulated to provide for the dispensing of the sprayed wax onto the mangle for the time desired depending on the need, to furnish and afford its automatic lubrication. At the same time, all of the other attributes as previously described in the background of the invention, where the polyolefin wax provides for lubricating of the roll(s) and thence by rotation to its trough, and likewise achieves a cleaning of the trough, because the wax incorporates a cleaner, and furthermore, provides for the removal and discharge of any static electricity, that may have previously built up, because said wax also incorporates an anti-static agent, as aforesaid. When this is completed, phase 3 is entered, which provides for an opening of the solenoid 15 associated with the back roll, so that further lubricating wax under pressure can be discharged into its spray conduit 11, and sprayed through the nozzles 16 onto the said back roll. This spray continues as needed, to achieve its proper coating with a lubricating wax. Following this, phase 4 is entered, the feeder 6 is turned on once again, the pump 13 is shut off, by de-energization of its motor 20, the vacuum motor or exhaust fan 22 is reinitiated on, to allow for the routine usage of and operations of the flatwork ironer, once again. At this time, also, a resetting of the timer within the control box occurs, to provide for a timed reinitiation of a lubricating cycle, a few hours hence, during a work cycle, or until the draw of excessive amperage occurs, as explained. The entire operation for each roll takes approximately 10 seconds, and the flatwork ironer is ready for reusage, for routine ironing, within a matter of a total of 20 seconds time delay. Thus, during an eight hour work cycle, when approximately three, more or less, lubrications are required, there is only approximately a 60 seconds, or less, downtime, in the operations of the flatwork ironer, with a minimum of labor lost, and with no manual participation in the automatic lubrication as achieved, through the application and performance of this invention.

Figure 5:
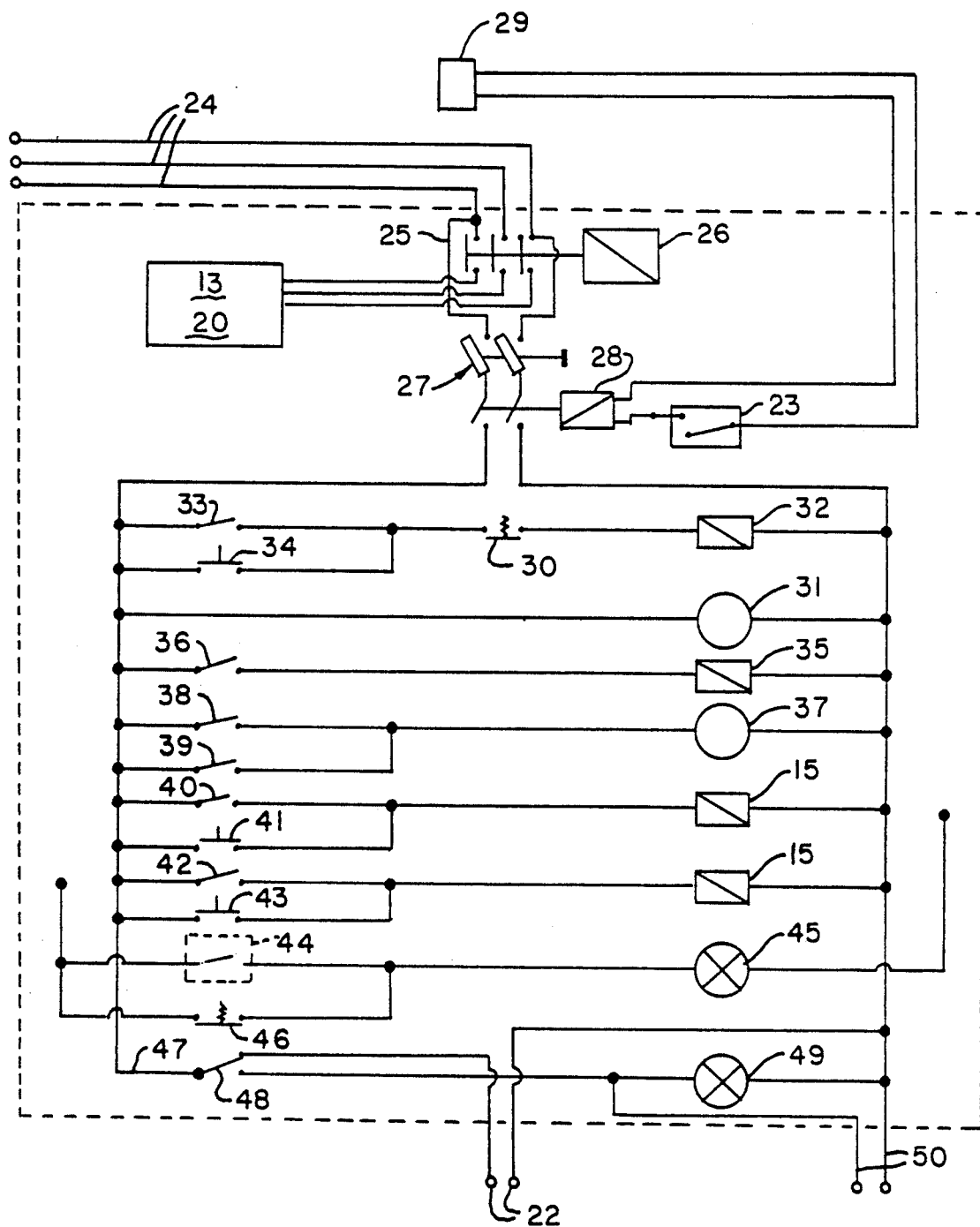
FIG. 5 is a electrical schematic showing the various components used in providing the automatic control to the operations of the flatwork ironer, and for the dispensing of lubricating wax thereto.

As can be seen in FIG. 5, the schematic for the control means, which is generally embodied within the control panel 21 of the device, is disclosed. These controls provide for the phased operations of the automatic lubrication, as previously explained, through the usage of various components.

The electrical energy supplied to the controls enters through the main circuit lines 24. Switch means 25 is normally opened, but when initiated by timer means, initiates the relay 26 for furnishing an operation to the pump, through its motor, as at 20. Fuse means 27 is furnished for safety reasons. A relay 28 is provided within the circuitry and in conjunction with the timer means, indicates that the level control 23 within the reservoir 14 has an adquate supply of lubricating wax therein, and in addition, is responsive to the magnetic switch motor ironer control 29 for assuring the motor is turned off, to the exhaust fan 22, before a lubricating cycle commences. The timer switch 30 is initiated from the timer 31, and initiates a relay, as at 32, that commences operations of the motor 20, and its pump 13. At this time, a cam 33 provides for initiation of the switch 30, which may be done either automatically, through the timer 31, or through a push button 34. A reset means, as at 35, provides for a resetting of the timer, and this is achieved through the actuation of the cam 36, within the control panel 21. A programmer, as at 37, provides the integrated circuitry necessary for furnishing the programmed functioning of the timer, its initiation, and a programmed operation of the entire lubricating system, to conduct the various phases of lubrication as previously explained. This integrated circuitry may be obtained from Allan Bradley Company, of Milwaukee, Wis., under model No. SLC 100. Additional cams 38, 39, and 40 are provided and particularly when the cam 40 is initiated, into its operating cycle, it opens the solenoid valve 15 provided in conjunction with the front roll 5, as previously explained. A substitute push button 41 is provided, and may provide for a manual opening or closing of the solenoid valve 15, as may be desired. A cam means 42 within the control provides for the timed opening of the solenoid valve 15 operatively associated with the rear roll 5, as previously explained. A manual switch 43 is likewise provided for furnishing a means for achieving the manual opening or closing of said solenoid valve 15. The level control switch 44 is provided, and cooperates with the switch 23, for initiating a turn-on of a light signal 45 in the event that the level of lubricating wax within the reservoir 14 is too low for operations of a lubrication cycle. A switch 46 provides for a turn-off of the pump, once a cycle has been completed. The timer circuit line 47 has included in it the timing cycle switch 48, which provides for an interruption of the fan 22, when a timing cycle has been initiated, and also provides for the initiation of a signal light, as at 49, to indicate that all conditions in the control panel and the lubricating mechanisms are satisfactory, and a lubricating cycle can be initiated. Circuit lines, as at 50, provide contact with the feed table 6, to shut it off, or reinitiate the same, before and after a lubricating cycle has begun and has been completed. In addition, the ammeter, as previously explained, may connect herein to provide for an initiation of a shut off of the feed table and initiation of a lubricating cycle upon detecting a heavy draw of current due to the build up of excessive friction in the ironer.

These are the electrical-mechanical controls embodied within the control panel 21, and which provide for the timed operations of the lubricating cycle, and the shut off and turn on of various components, within the flatwork ironer, to achieve its automatic cycling, and enhanced results. The signal light 45 provides for an indication of the low level of a lubricating wax within the reservoir.

Variations or modifications to the subject matter of this invention may occur to those skilled in the art upon reviewing the subject matter of this disclosure. Such variations or modifications, if within the spirit of this invention, are intended to be encompassed within the scope of any claims to patent protection issuing upon this development. The description of the preferred embodiment set forth herein is done so for illustrative purposes only.

Having thus described the invention, what is claimed and desired to be secured by Letters Patent is:

1. In a flatwork ironer of the type used for ironing flat cloth items, and wherein the ironer includes at least one chest and rotating roll and having associated therewith a sprayer for deposition of lubricating wax upon the rotating roll and thence to the chest to facilitate the ironing process, the improvement comprising, a housing for the ironer for supporting each of said at least one roll during usage, a spray means spanning a width of each roll and spaced therefrom at an upward position to periodically spray said lubricating wax thereon, said spray means including a spray conduit, a series of spray nozzles spacedly arranged upon said conduit for accommodating wax spray, a pump, a motor operatively associated with said pump for said conveying wax under pressure through said conduit, a solenoid valve associated with said conduit and when actuated, opening to provide for the flow under pressure of said wax to and through the conduit and to discharge said wax from the spray nozzle and onto a respective proximate roll, timer means operatively associated with said motor, and solenoid valve to initiate an actuation of said motor, and subsequently the opening of said valve to provide spraying of said wax onto the proximate roll for the time needed, said timer means incorporating a time delay therein to allow the ironer to pass any remaining cloth item through the ironer before the solenoid valve opens to pass said wax under pressure through the spray means for deposition onto the proximate roll, a wax reservoir for holding a supply of said lubricating wax, a return line communicating with said conduit for returning unsprayed wax to the reservoir, and said wax being a fluidic polyolefin capable of being pumped under pressure from the reservoir for periodic deposition by spraying onto the proximate roll during usage of the ironer.

2. The invention of claim 1 wherein said ironer incorporating two rolls and chests and two solenoid valves, said timer means regulates the timed functioning of said roll and to allow any cloth item to pass therethrough before each solenoid opens to pass lubricating wax to a respective spray means for deposition onto said proximate roll for the time needed.

3. The invention of claim 2 wherein said polyolefin wax includes an antistatic lubricant and a cleaner.

4. The invention of claim 1 including motor means operatively associated with said rolls for inducing their rotation during ironer operation, an ammeter electrically connected with the motor means for detecting when an excessive current is being drawn due to a friction buildup in the ironer's operation while processing of said cloth items for initiating a lubrication cycle of the rolls.

* * * * *

UNITED STATES PATENT AND TRADEMARK OFFICE
CERTIFICATE OF CORRECTION

PATENT NO. : 4,998,359
DATED : March 12, 1991
INVENTOR(S) : Bill R. Rhymer

It is certified that error appears in the above—identified patent and that said Letters Patent is hereby corrected as shown below:

Column 10, (Claim 1), line 19, change "said conveying" to ---conveying said---.

Signed and Sealed this

Twenty-eighth Day of July, 1992

Attest:

DOUGLAS B. COMER

*Attesting Officer*  *Acting Commissioner of Patents and Trademarks*